UNITED STATES PATENT OFFICE.

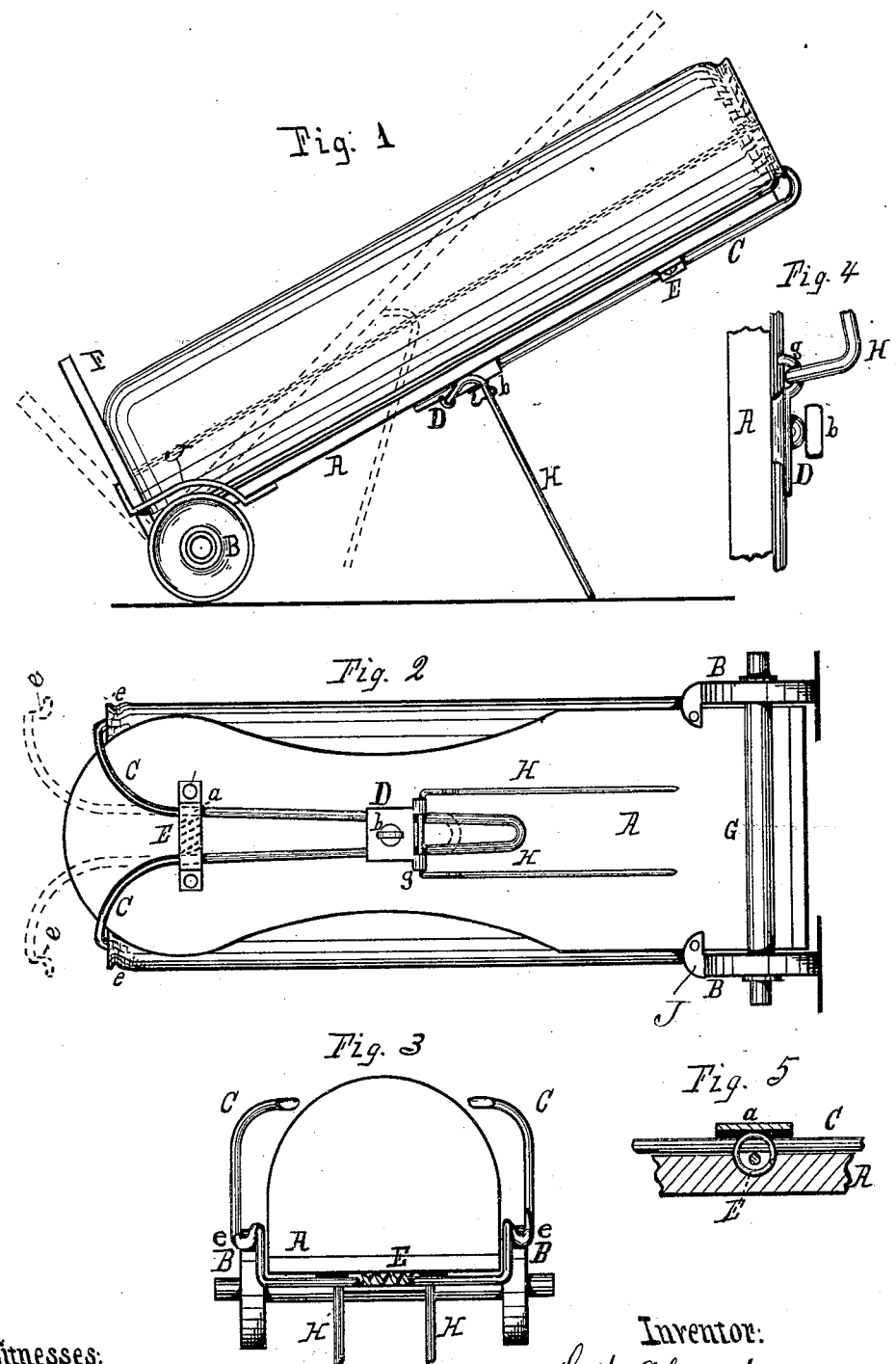

LYMAN H. ALDRICH, OF SHORTSVILLE, NEW YORK.

BAG-HOLDER AND TRUCK THEREFOR.

SPECIFICATION forming part of Letters Patent No. 234,381, dated November 16, 1880.

Application filed September 18, 1879.

*To all whom it may concern:*

Be it known that I, LYMAN H. ALDRICH, of Shortsville, Ontario county, New York, have invented an Improved Bag-Holder and Truck, of which the following is a specification, reference being had to the annexed drawings, in which—

Figure 1 is a side view of my improved bag-holder. Fig. 2 is a front view of the same, and Fig. 3 is a view of my improved bag-holder as seen from above. Figs. 4 and 5 represent details.

My invention consists in certain improvements in the construction of bag-holders, whereby they are increased in efficiency and cheapness, the device being formed of a continuous rod bent into peculiar shape to distend the mouth of the bag, and adjustable on its support, as hereinafter more fully described.

It also consists in the combination of my improved bag-holding device with a wheeled truck provided with bent and pivoted supporting-legs of peculiar form and arrangement.

In the accompanying drawings, A A is the body of the truck or other support, to which the bag-holder is attached; B B, the truck-wheels; C C, the arms of the bag-holder proper; D, the clamp by which the arms C C are adjusted vertically, and H H a leg or legs pivoted to the body A. The body A may be constructed in any ordinary or desired form. At its lower end it is provided with a foot, F, and the wheels B B, which turn freely on the outer ends of the axle G.

The arms C C are made of a continuous metallic rod, which is bent double at the middle of its length, and the two ends then bent outward, then downward and outward, as represented at *e e*, Figs. 2 and 3, after which they proceed forward and form the jaws for distending the mouth of the bag. The ends of the arms C C are turned inward and flattened at the points, so as to take a firm hold on the interior of the bag.

The lower end of the rod forming the bag-holder is secured to the support by the clamp D, which is provided with a thumb-screw, *b*. By this arrangement a vertical adjustment of the jaws C C is permitted, so as to adapt the device to bags of different lengths.

Above the clamp D the arms C C are attached to the support by a guide, *a*, within which they are free to move transversely. They are separated by a spring, E, which is located partially in a recess formed for it in the support, being held in place by a rod passing longitudinally through it, as represented in Fig. 5, which is a longitudinal section.

Fig 4 is a side view, showing the clamp D, to which the upper end of the bent supporting-leg H is pivoted. A hook or loop, *g*, Figs. 2 and 4, is formed on the end of the clamp D, under which the leg H passes. The leg H swings freely in the loop *g*, and it is made of such a length as to clear the floor when the truck is elevated, as indicated by the dotted lines in Fig. 1.

The bent arms C C form convenient handles for the truck. The position of a bag on the truck with its mouth distended by the arms C C is represented in Figs. 1 and 2. The arms C C readily adjust themselves to any size of bag.

In order to give a rigid connection between the body of the truck and the foot-board, and at the same time prevent the sacks from coming in contact with the wheels, I make use of the guards J. These guards are cast in a curved form to cover the wheels, and have at the ends strong flanges or lugs, which are bolted to the truck and the foot-board respectively.

A peculiar and important feature of my distending and holding arms C is the downward and outward curvature at the point *e*, which greatly facilitates the application of the bag to the arms and insures a secure holding of the bag in every instance.

The employment of the spring E is important for the reason that while it forces the arms C apart with sufficient pressure to insure the retention of the bag upon the arms, it is at the same time far more elastic and easy of compression than would be the arms C if made sufficiently stiff to produce the same result, while, moreover, the use of iron instead of spring-steel for the construction of the arms is permitted.

My improved bag-holder is cheap in construction and convenient to use, as the bag, after being filled, may at once, without any further handling, be wheeled away to any desired locality.

I am aware that yielding arms provided with toothed jaws have been previously used in bag-holders to distend the mouth of the bag, and such I do not claim.

I claim—

1. In a bag-holder, a pair of yielding arms, C, each consisting of an upright portion having its upper end bent downward and outward, as indicated at e, and extended thence forward, as shown.

2. In combination with the frame or truck, the arms C, and legs H, the clamp D, constructed and arranged as shown, whereby it is adapted to hold both the legs and the adjustable arms.

3. The combination of the body or truck frame adapted to support a bag, the foot-board, the wheels, and the curved flanged guard-plates J, constructed and applied as shown, whereby they are adapted to protect the bag and to brace the foot-board.

LYMAN H. ALDRICH.

Witnesses:
W. B. DUTTON,
GEO. B. SELDEN.